(12) United States Patent
Hisamori et al.

(10) Patent No.: US 8,734,568 B2
(45) Date of Patent: May 27, 2014

(54) ASYMMETRIC HOLLOW FIBER GAS SEPARATION MEMBRANE

(75) Inventors: Hiroki Hisamori, Ube (JP); Tatsuya Hayashi, Ube (JP); Seiji Morihashi, Ube (JP); Tomonori Kanougi, Ichihara (JP)

(73) Assignee: Ube Industries, Ltd., Ube-shi (JP)

( * ) Notice: Subject to any disclaimer, the term of this patent is extended or adjusted under 35 U.S.C. 154(b) by 0 days.

(21) Appl. No.: 13/638,087

(22) PCT Filed: Mar. 30, 2011

(86) PCT No.: PCT/JP2011/058053
§ 371 (c)(1),
(2), (4) Date: Sep. 28, 2012

(87) PCT Pub. No.: WO2011/122668
PCT Pub. Date: Oct. 6, 2011

(65) Prior Publication Data
US 2013/0019748 A1 Jan. 24, 2013

(30) Foreign Application Priority Data

Mar. 30, 2010 (JP) ................... 2010-079618

(51) Int. Cl.
*B01D 53/22* (2006.01)

(52) U.S. Cl.
USPC ............. 95/47; 95/43; 95/45; 95/54; 96/4; 96/8; 96/10

(58) Field of Classification Search
CPC ....... B01D 53/22; B01D 53/228; B01D 71/64

USPC .............. 95/43, 45, 47, 54; 96/4, 8, 10
See application file for complete search history.

(56) References Cited

U.S. PATENT DOCUMENTS

| 5,030,252 | A | * | 7/1991 | Sanders et al. ............. 95/47 |
| 5,215,554 | A | * | 6/1993 | Kramer et al. .............. 95/47 |
| 5,286,539 | A | | 2/1994 | Kusuki et al. |
| 7,771,518 | B2 | * | 8/2010 | Yoshinaga et al. .......... 96/4 |
| 7,803,214 | B2 | * | 9/2010 | Kase et al. ................. 95/54 |

(Continued)

FOREIGN PATENT DOCUMENTS

| JP | A-H02-9429 | 1/1990 |
| JP | A-H05-68859 | 3/1993 |
| JP | A-H06-254367 | 9/1994 |
| JP | A-2008-43945 | 2/2008 |

OTHER PUBLICATIONS

International Preliminary Report on Patentability issued in Application No. PCT/JP2011/058053 on Nov. 22, 2012.

(Continued)

*Primary Examiner* — Jason M Greene
*Assistant Examiner* — Anthony Shumate
(74) *Attorney, Agent, or Firm* — Knobbe Martens Olson & Bear LLP

(57) ABSTRACT

The present invention relates to an asymmetric hollow fiber membrane for gas separation made of a soluble aromatic polyimide, wherein an orientation index is 1.3 or less, a separation coefficient $\alpha(P'O_2/P'N_2)$ as a permeation rate ratio of oxygen gas/nitrogen gas at 40° C. is 5.3 or more, and a tensile fracture elongation is 15% or more.

5 Claims, 2 Drawing Sheets

(56) References Cited

U.S. PATENT DOCUMENTS

| | | | |
|---|---|---|---|
| 8,366,804 B2 * | 2/2013 | Liu et al. | 95/45 |
| 8,409,325 B2 * | 4/2013 | Yoshinaga et al. | 95/47 |
| 2004/0210289 A1 * | 10/2004 | Wang et al. | 607/116 |
| 2008/0017029 A1 | 1/2008 | Kase et al. | |
| 2008/0134885 A1 * | 6/2008 | Yoshinaga et al. | 95/47 |

OTHER PUBLICATIONS

Niwa et al., "Surface orientation effect of asymmetric polyimide hollow fibers on their gas transport properties" Journal of Membrane Science, vol. 230, No. 1-2, pp. 141-148, Feb. 15, 2004.

Extended European Search Report issued on Dec. 11, 2013 in corresponding European Application No. 11762892.5, 6 pages.

* cited by examiner

X

Y

ASYMMETRIC HOLLOW FIBER GAS SEPARATION MEMBRANE

This application is the U.S. National Phase under 35 U.S.C. §371 of International Application No. PCT/JP2011/058053, filed Mar. 30, 2011, designating the U.S., and published in Japanese as WO2011/122668 on Oct. 6, 2011, which claims priority to Japanese Patent Application No. 2010-079618, filed Mar. 30, 2010, the entire content of which is incorporated herein by reference.

TECHNICAL FIELD

The present invention relates to an asymmetric hollow fiber membrane for gas separation, which is made of an aromatic polyimide and which has both excellent gas separation performance and improved mechanical properties.

BACKGROUND ART

There has been known an asymmetric hollow fiber membrane for gas separation produced using an aromatic polyimide prepared from a tetracarboxylic acid component containing biphenyl tetracarboxylic acid, pyromellitic acid and 4,4'-(hexafluoroisopropylidene)diphthalic acid, and a diamine component having an intramolecular sulfonic group.

As a hollow fiber membrane having such a composition, Patent Reference No. 1 (Japanese laid-open patent publication No. 1993-68859) has described a gas separation membrane exhibiting higher gas permselectivity and having excellent mechanical properties, but a separation coefficient $\alpha$ ($P'O_2/P'N_2$) as a representative element of gas permselectivity is 4.7 to 4.9, which must be further improved.

Patent Reference No. 2 (Japanese laid-open patent publication No. 1994-254367) has described an excellent gas separation membrane having a high separation coefficient $\alpha$. This gas separation membrane is suitable for producing a nitrogen-rich air and an oxygen-rich air and has a separation coefficient $\alpha(P'O_2/P'N_2)$ of 5.3 or more. The membrane, however, frequently has a low permeation rate $P'O_2$ of 4.4 or less, and thus, when it is used in a module, it causes deterioration in performance due to variation in a permeation rate $P'O_2$ or $P'N^2$, and when $P'O_2$ or $P'N_2$ is low, a too large membrane area is required, leading to disadvantage that a module cannot be efficiently designed or produced. Patent Reference No. 2 has described an example with a large permeation rate $P'O_2$ (Example 1), but has not described mechanical properties. A membrane in this example has a low density probably because a dope solution for spinning has a low concentration and a relatively lower molecular weight. As a result, a large permeation rate $P'O_2$ can be obtained, whereas mechanical strength is reduced. In particular, since the membrane is processed at a high temperature of 330° C. for achieving performance of $\alpha \geq 5.3$, it further has insufficient mechanical properties such as elongation at break. When the elongation at break is insufficient, yarn break during producing a separation module by bundling hollow fiber membranes, or deterioration or variation in performance is caused.

PRIOR ART REFERENCES

Patent References

Patent Reference No. 1: Japanese laid-open patent publication No. 1993-68859.

Patent Reference No. 2: Japanese laid-open patent publication No. 1994-254367.

Problem to be Solved by the Invention

An objective of the present invention is to provide an asymmetric hollow fiber membrane for gas separation, which is made of an aromatic polyimide and which has both excellent gas separation performance and excellent mechanical properties. Since a hollow fiber membrane of the present invention has excellent gas separation performance for oxygen and nitrogen gases and excellent mechanical properties, it can be suitably used for producing a nitrogen-rich air with an increased nitrogen concentration or an oxygen-rich air with an increased oxygen concentration.

Means for Solving Problem

The present invention relates to an asymmetric hollow fiber membrane for gas separation which is made of a soluble aromatic polyimide, wherein an orientation index is 1.3 or less; a separation coefficient $\alpha(P'O_2/P'N_2)$ which represents a ratio of a permeation rate of oxygen gas and nitrogen gas at 40° C. is 5.3 or more; and a tensile elongation at break is 15% or more.

In particular, an oxygen gas permeation rate $P'O_2$ at 40° C. is preferably $6.0 \times 10^{-5}$ cm$^3$ (STP)/cm$^2$·sec·cmHg or more.

Advantage of the Invention

According to the present invention, there can be provided an asymmetric hollow fiber membrane for gas separation, which is made of an aromatic polyimide and which has both excellent gas separation performance and excellent mechanical properties. A hollow fiber membrane of the present invention is excellent in gas separation performance for oxygen and nitrogen gases and in mechanical properties. It can be, therefore, suitably used for providing a nitrogen-rich air with an increased nitrogen concentration or an oxygen-rich air with an increased concentration of oxygen from the air.

MODE FOR CARRYING OUT THE INVENTION

Figure 1:
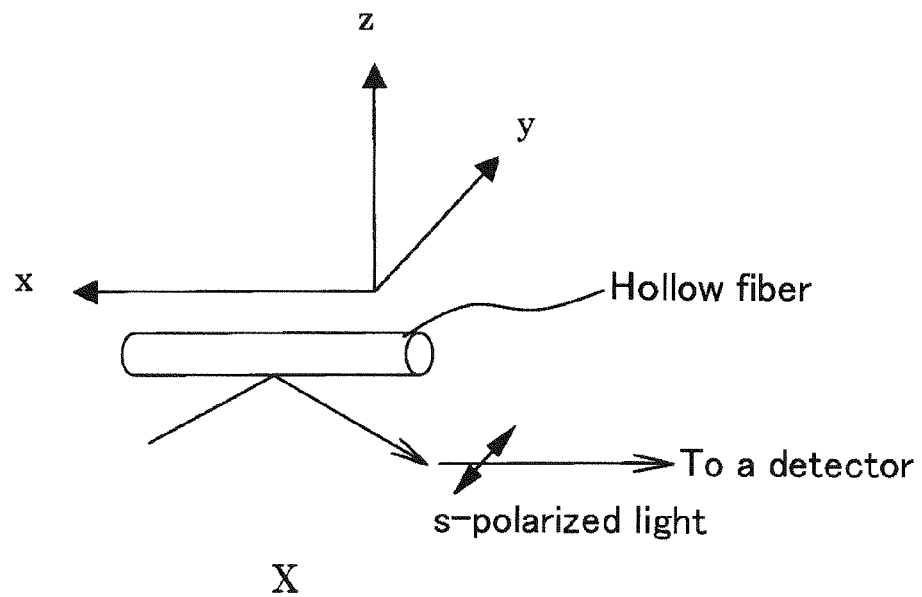
FIG. 1 illustrates a method for measuring an orientation index.

An asymmetric hollow fiber membrane for gas separation of the present invention is made of a soluble aromatic polyimide, has an asymmetric structure consisting of an extremely thin dense layer (preferably, a thickness of 0.001 to 5 µm) that is mainly responsible for gas separation and a relatively thicker porous layer (preferably, a thickness of 10 to 2000 µm) that supports the dense layer, and has excellent gas separation performance. Preferably, it is a hollow fiber membrane having an inner diameter of 10 to 3000 µm and an outer diameter of about 30 to 7000 µm.

An asymmetric hollow fiber membrane for gas separation of the present invention has an orientation index of 1.3 or less. An orientation index is an index indicating orientation of polyimide molecules in the dense layer, and it has been found that a hollow fiber having a low orientation index has a large oxygen gas permeation rate P'O$_2$ and an large elongation. Thus, when a separation coefficient α(P'O$_2$/P'N$_2$) is identical, a hollow fiber having a lower orientation index has a larger permeation rate P'O$_2$ and a larger elongation, resulting in better mechanical properties. A method for measuring an orientation index will be described in Examples.

A separation coefficient α(P'O$_2$/P'N$_2$) which represents a ratio of permeation rate of oxygen gas and nitrogen gas at 40° C. is 5.3 or more, preferably 5.6 or more. An oxygen gas permeation rate P'O$_2$ at 40° C. is preferably 6.0×10$^{-5}$ cm$^3$ (STP)/cm$^2$·sec·cmHg or more, more preferably 7.0×10$^{-5}$ cm$^3$ (STP)/cm$^2$·sec·cmHg or more.

Furthermore, an elongation, that is, a tensile elongation at break as a hollow fiber membrane is 15% or more, preferably 20% or more.

An aromatic polyimide forming an asymmetric hollow fiber membrane for gas separation of the present invention (hereinafter, sometimes simply referred to as "hollow fiber membrane") is represented by the repeating unit of general formula (1).

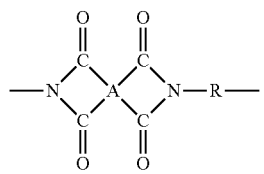

Formula (1)

wherein in general formula (1), 25 to 100 mol % of A is a tetravalent unit based on a biphenyl structure represented by formula (2):

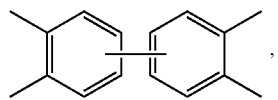

Formula (2)

0 to 70 mol % of A is a tetravalent unit based on a diphenylhexafluoropropane structure represented by formula (3):

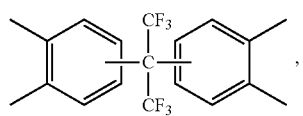

Formula (3)

and 0 to 30 mol % of A is a tetravalent unit based on a phenyl structure represented by formula (4):

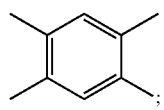

Formula (4)

and in general formula (1), 30 to 70 mol % of R is a divalent unit based on a diphenylene sulfone structure represented by formula (5):

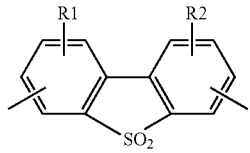

Formula (5)

where R1 and R2 in formula (5) are a hydrogen atom or a lower alkyl group, and 30 to 70 mol % of R is a divalent unit based on a biphenyl structure represented by formula (6):

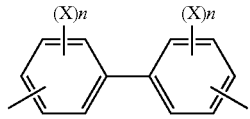

Formula (6)

where X in formula (6) is a chlorine or bromine atom and n is 1 to 3.

In the present invention, examples of a tetravalent unit based on a biphenyl structure represented by formula (2) which is derived from a tetracarboxylic acid component may include residues of biphenyl tetracarboxylic acids such as 3,3',4,4'-biphenyl tetracarboxylic acid and its anhydride and 2,3,3',4'-biphenyl tetracarboxylic acid and its anhydride. The tetravalent unit based on a biphenyl structure represented by formula (2) is contained in 25 to 100 mol %, preferably 30 to 100 mol %, more preferably 30 to 80 mol %. The biphenyltetracarboxylic acids facilitate forming a thin membrane with no defects in a film production, forming a hollow fiber membrane and so on. If its amount is too small, membrane forming may be difficult or defects may be caused, which is disadvantageous in practical use.

Examples of a tetravalent unit based on a diphenylhexafluoropropane structure represented by formula (3) may include residues of diphenylhexafluoropropanes such as 2,2-bis(3,4-dicarboxyphenyl)hexafluoropropane and its anhydride. The tetravalent unit based on a diphenylhexafluoropropane structure represented by formula (3) is contained in 0 to 70 mol %, preferably 10 to 60 mol %, more preferably 20 to 50 mol %. The diphenylhexafluoropropanes are effective for increasing an oxygen permeation rate, but when an amount thereof is too much, a permselectivity is decreased.

In the present invention, examples of the tetravalent unit based on the phenyl structure represented by formula (4) may include residues of pyromellitic acids such as pyromellitic acid and its anhydride. The tetravalent unit based on the phenyl structure represented by formula (4) is contained in 0 to 30 mol %, preferably 10 to 20 mol %. The pyromellitic acids are suitably used to enhance the mechanical strength, but when an amount thereof is too much, the polymer solution used for membrane preparation undesirably becomes coagulated or unstable, which makes forming a hollow fiber difficult.

In the present invention, examples of a divalent unit based on the diphenylene sulfone structure represented by formula (5) which is derived from a diamine component may include residues of diaminodiphenylene sulfones such as 3,7-diamino-2,8-dimethyl-diphenylene sulfone, 3,7-diamino-2,8-diethyl-diphenylene sulfone and 3,7-diamino-2,6-dimethyl-diphenylene sulfone. A divalent unit based on a diphenylene sulfone structure represented by formula (5) is suitably contained in 30 to 70 mol %, preferably, 30 to 60 mol %. The diaminodiphenylene sulfones are effective for increasing permeation performance, but when an amount thereof is too much, a permselectivity is decreased.

In the present invention, examples of a divalent unit based on a biphenyl structure represented by formula (6) which is derived from a diamine component may include residues of benzidines such as 2,2',5,5'-tetrachlorobenzidine, 3,3',5,5'-tetrachlorobenzidine, 3,3'-dichlorobenzidine, 2,2'-dichlorobenzidine, 2,2',3,3,5,5'-hexachlorobenzidine, 2,2',5,5'-tetrabromobenzidine, 3,3',5,5'-tetrabromobenzidine, 3,3'-dibromobenzidine, 2,2'-dibromobenzidine and 2,2',3,3',5,5'-hexachlorobenzidine. Among these, a benzidine in which X is a chlorine atom in formula (6) and n is 2 is suitable in the light of a permeation rate, a permselectivity and so on. A divalent unit based on a biphenyl structure represented by formula (6) is suitably contained in 30 to 70 mol %, preferably 30 to 60 mol %. The benzidines contribute to increase a permselectivity, but when an amount thereof is too much, a polymer becomes insoluble and membrane forming is difficult, and when an amount thereof is too low, a permselectivity is disadvantageously decreased.

An asymmetric hollow fiber polyimide membrane for gas separation of the present invention substantially exerts its effects by containing a repeating unit represented by general formula (1) derived from the tetracarboxylic acid component and the diamine component described above, but it can contain a unit derived from a tetracarboxylic acid component and a diamine component other than those described above without departing from the scope of this invention. Examples of another tetracarboxylic acid component may include diphenyl ether tetracarboxylic acids, benzophenone tetracarboxylic acids, diphenyl sulfone tetracarboxylic acids, naphthalene tetracarboxylic acids, diphenylmethane tetracarboxylic acids and diphenylpropane tetracarboxylic acids. Examples of another diamine component may include diaminodiphenylmethanes, diaminodiphenyl ethers, diaminodibenzothiophenes, diaminobenzophenones, bis(aminophenyl) propanes, phenylenediamines and diaminobenzoic acids.

A solution of the above aromatic polyimide is suitably prepared by two step process comprising adding a tetracarboxylic acid component and a diamine component to an organic polar solvent in a predetermined composition ratio, polymerizing the mixture at a low temperature such as about room temperature to form a polyamide acid followed by heating imidization or by chemical imidization by adding pyridine and the like; or alternatively one-step process comprising adding a tetracarboxylic acid component and a diamine component to an organic polar solvent in a predetermined composition ratio and polymerizing and imidizing the mixture at a high temperature such as about 100 to 250° C., preferably about 130 to 200° C. During imidization by heating, it is preferable to remove eliminated water or alcohol. The used amounts of a tetracarboxylic acid component and a diamine component to an organic polar solvent are determined so that a concentration of a polyimide in the solvent is suitably about 5 to 50% by weight, preferably 5 to 40% by weight.

The aromatic polyimide solution prepared by polymerization and imidization may be used as it is as a dopant solution for spinning. Alternatively, for example, the aromatic polyimide solution thus obtained is poured into a solvent in which the aromatic polyimide is insoluble to precipitate the aromatic polyimide, which is then isolated and again dissolved in an organic polar solvent in a predetermined concentration to prepare an aromatic polyimide solution, which can be used for spinning. A concentration of the polyimide in the spinning dope solution is preferably about 5 to 50% by weight, more preferably 5 to 40% by weight, particularly preferably 10 to 30% by weight. When the concentration is too low, not only a viscosity is reduced and thereby deformation of a hollow fiber during molding is caused, but also a degree of shrinkage of a membrane size during extraction of a polymerization solvent with a poor solvent is increased and thereby size controlling is difficult. In addition, the amount of a polymerization solvent must be increased, which is uneconomical. When the concentration is too high, a viscosity is increased and thus a back pressure in a spinning nozzle unit is increased too much, and thereby undue production facilities are required. In addition, when the viscosity is too high, it is difficult to increase an amount of extrusion (increase in a back pressure), leading to reduction in productivity.

In an aromatic polyimide solution used for spinning, a polyimide concentration is 5 to 40% by weight, preferably 8 to 25% by weight, and a solution viscosity (rotational viscosity) at 100° C. is 100 to 15000 poise, preferably 200 to 10000 poise, particularly preferably 300 to 5000 poise. If a solution viscosity is less than 100 poise, a homogeneous membrane (film) may be provided, but it is difficult to obtain an asymmetric membrane with high mechanical strength and elongation. If it is more than 15000 poise, the solution is difficult to extrude from the spinning nozzle and thus it is difficult to obtain an asymmetric hollow fiber membrane with a desired shape. In the present invention, the viscosity is particularly preferably 1000 to 4000 poise.

There are no particular restrictions to an organic polar solvent (for polymerization or spinning) as long as it suitably dissolve an aromatic polyimide obtained; suitable examples include phenolic solvents including phenols such as phenol, cresol and xylenol, catechols having two hydroxy groups in a benzene ring such as catechol and resorcin, and halogenated phenols such as 3-chlorophenol, 4-chlorophenol (identical to para-chlorophenol described later), 3-bromophenol, 4-bromophenol and 2-chloro-5-hydroxytoluene; amide solvents including amides such as N-methyl-2-pyrrolidone, 1,3-dimethyl-2-imidazolidinone, N,N-dimethylformamide, N,N-diethylformamide, N,N-dimethylacetamide and N,N-diethylacetamide; and mixtures thereof.

A hollow fiber membrane of the present invention is preferably obtained by spinning by a dry/wet process (dry/wet spinning process) using the above aromatic polyimide solution. The dry/wet process is a process comprising evaporating a solvent in the surface of a polymer solution formed in a form of hollow fiber to form a thin dense layer (separation layer) and immersing the polymer into a coagulation liquid (a solvent miscible with the solvent of the polymer solution and incapable of dissolving the polymer) to form fine pores by using phase separation phenomenon occurring here so as to form a porous layer (support layer) (phase inversion method), which has been proposed by Loeb et al. (for example, U.S. Pat. No. 3,133,132).

The producing process generally comprises the steps of spinning (spinning dope extruding step), coagulation, washing, drying and heating. These steps include the step(s) in which the hollow fiber must be essentially continuously processed by being continuously fed/drawn, and the step(s) in which the hollow fiber can be either processed batchwise in the state of being wound on a bobbin or the like or continuously processed.

First, in the spinning step (spinning dope extruding step), a spinning nozzle used for extruding a spinning dope solution is those capable of extruding a spinning dope solution in a form of hollow fiber, and is preferably a tube-in-orifice type nozzle. Generally, a temperature range of an aromatic polyimide solution during extrusion is preferably about 20° C. to 150° C., particularly preferably 30° C. to 120° C. A suitable temperature range varies, depending on the type of a solvent in the dope, a viscosity and so on. Furthermore, while a spinning is conducted, a gas or liquid is fed into the inside of the hollow fiber-shaped material extruded from the nozzle.

In the coagulation step continued from the spinning step, the hollow fiber-shaped material discharged from the nozzle is extruded into, for example, the air or the atmosphere of an inert gas such as nitrogen, and is successively introduced into a coagulation bath and immersed in a coagulation liquid. A suitable coagulation liquid does not substantially dissolve the aromatic polyimide component and compatible to the solvent in the aromatic polyimide solution. Suitable examples include, but not limited to, water; lower alcohols such as methanol, ethanol and propyl alcohol; ketones having a lower alkyl group such as acetone, diethyl ketone and methyl ethyl ketone; and mixture thereof. Furthermore, when the solvent in the aromatic polyimide solution is an amide type solvent, an aqueous solution of the amide type solvent is also preferable.

In the coagulation step, preferably, the aromatic polyimide solution discharged in a hollow fiber form from the nozzle is immersed in a first coagulation liquid which coagulates the solution as much as its shape can be maintained, and then immersed in a second coagulation liquid for completing coagulation. The first and the second coagulation liquids may be the same or different. Alternatively, a plurality of coagulation tanks may be used to efficiently extract the solvent in the polyimide solution.

The spinning and the coagulation steps are essentially continuous steps where a hollow fiber is continuously fed/drawn while the hollow fiber is continuously processed.

In the subsequent washing step, the hollow fiber is, if necessary, washed with a washing solvent such as ethanol, and then the coagulation liquid and/or the washing solvent in the outside and the inside of the hollow fiber are replaced with a replacing solvent, for example, an aliphatic hydrocarbon such as isopentane, n-hexane, isooctane and n-heptane.

In the subsequent drying step, the hollow fiber containing the replacing solvent is dried at an appropriate temperature. Then, in the heating step, preferably, the fiber is heated at a temperature which is lower than a softening point or second-order transition point of the aromatic polyimide used, to give an asymmetric hollow fiber membrane for gas separation.

The above washing, drying and heating steps can be continuous processes where the hollow fiber is continuously processed while it is continuously fed/drawn, or can be batch processes where the fiber is processed in a state of being wound on, for example, a bobbin.

In the continuous steps in the producing process, a hollow fiber membrane to which a tension is applied is processed. It has been found that an excessive tension in each step causes reduction in an oxygen permeation rate. Therefore, for providing a hollow fiber membrane of the present invention, the tension must be properly controlled in each step, and a tension is preferably 1.5 N or less, more preferably 1.0 N or less.

First, for improvement and stability of gas permeation performance, it is important to generate a state with a low molecular orientation (disordered state) in a skin layer which is present in the surface and determining the performance of the hollow fiber membrane, and to conduct the process with maintaining the low-orientation state as much as possible until the hollow fiber membrane is finally formed. If the tension is applied too much to the hollow fiber membrane during the subsequent washing, drying or heating step, molecular orientation is promoted due to stretching, leading to reduction in a permeation rate.

Specifically, it is effective in the spinning step to reduce an extrusion line velocity from a spinning nozzle, to reduce a draft ratio and to increase a slit width. Furthermore, in the steps of washing, drying, heating and further bundling by drawing hollow fiber membranes, a hollow fiber membrane retaining a predetermined orientation index can be produced by controlling the tension.

A hollow fiber membrane of the present invention can be suitably used as a module. A common gas separation membrane module is fabricated as follows: approximately 100 to 100,000 tubes of hollow-fiber membranes having an appropriate length are bound together; both ends of the resulting hollow-fiber bundle are fixed into a tube sheet made of a thermosetting resin and the like while at least one of the end of the hollow-fiber membrane is kept to be opened; and then a resulting hollow-fiber membrane element composed of the hollow-fiber bundle and the tube sheet is accommodated in a vessel that is equipped with at least a mixed gas inlet, a permeated gas outlet, and a non-permeated gas outlet, in such a manner that the space connected to the internal side of the hollow-fiber membranes is isolated from the space connected to the external side of the hollow-fiber membranes. In this gas separation membrane module, a mixed gas is fed from the mixed gas inlet to the inside of the hollow-fiber membranes or the space communicating to the outside; a specific gas component contained in the mixed gas is selectively permeated through the membrane; the permeated gas is discharged from the permeated gas outlet and the non-permeated gas that does not permeate through the membranes is discharged from the non-permeated gas outlet. In this way, gas separation is performed suitably.

A hollow fiber membrane of the present invention can separate and recover a variety of gases with a high permselectivity (a ratio of permeation rate). A high permselectivity is suitable because a recovery ratio for a desired gas can be increased. There are no particular restrictions to gases which can be separated. It can be suitably used for separation and recovery of for example, hydrogen gas, helium gas, carbon dioxide gas, hydrocarbon gas such as methane and ethane, oxygen gas and nitrogen gas. In particular, it can be suitably used for providing a nitrogen-rich air with a high concentration of nitrogen and an oxygen-rich air with a high concentration of oxygen from the air.

EXAMPLES

There will be further described the present invention with reference to Examples. The present invention is not limited to the examples described below.

Method for Measuring Gas Permeation Performance of a Hollow Fiber Membrane

An element for evaluating permeation performance with an effective length of 8 cm was prepared using six asymmetric hollow fiber membranes, a stainless-steel pipe and an epoxy resin adhesive, and mounted in a stainless-steel vessel to give a pencil module. Pure oxygen and nitrogen gases are fed to the outside of the hollow fiber membranes at a pressure of 1 MPaG and a temperature of 40° C., and a permeation flow rate was measured. From a permeation flow rate, a feeding pressure and an effective membrane area measured, permeation rates of the oxygen and the nitrogen gases were calculated. A permeation rate has a unit of $10^{-5} \times cm^3(STP)/(cm^2 \cdot s \cdot cmHg)$.

Measurement of an Elongation at Break and a Stress at Break of a Hollow Fiber Membrane Measurement was conducted with an effective length of 20 mm and a tensile rate of 10 mm/min using a tensile tester. Measurement was conducted at 23° C. A cross-sectional area of a hollow fiber was calculated by observing the cross section of the hollow fiber by optical microscopy and measuring the dimensions of an optical microscopic image.

Method for Measuring a Solution Viscosity

A solution viscosity of a polyimide solution was measured at a temperature of 100° C. using a rotating viscometer (shear rate of a rotor: 1.75 sec$^{-1}$).

Method for Measuring an Orientation Index

It is determined as described below, using a single reflection ATR-FTIR apparatus equipped with a polarizer (Spectrum One, from PerkinElmer).

$A_{\parallel/\perp}$ is defined as described below as an index for a magnitude of vibration parallel to a polyimide backbone.

$A_{\parallel/\perp}$=(absorbance at 1500 cm$^{-1}$)/(absorbance at 1715 cm$^{-1}$)

wherein absorption at 1500 cm$^{-1}$ is an absorption of the benzene ring for the vibration mode in a direction parallel to the backbone, and absorption at 1715 cm$^{-1}$ is an absorption of the carbonyl in the imide ring for the vibration mode in a direction vertical to the backbone.

Figure 2:
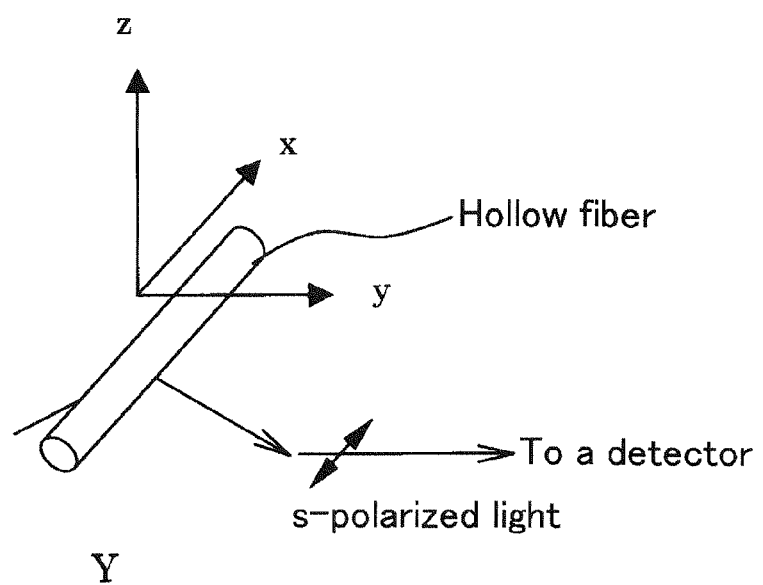
FIG. 2 illustrates a method for measuring an orientation index.

To the FT-IR apparatus, a hollow fiber is set as shown in FIGS. 1 and 2, and in X (FIG. 1), incident light enters from a hollow fiber length direction (x-axis direction) and reflected light passes through the polarizer and only s-polarized light (vertical polarized light: vertical to the incident and the reflection planes) is introduced to a detector, which measures infrared absorption spectrum. In Y (FIG. 2), incident light enters from a length direction and a vertical direction of a hollow fiber (y-axis direction) and a reflected light passes through the polarizer and only s-polarized light (vertical polarized light: vertical to the incident and the reflection planes) is introduced to a detector, which measures infrared absorption spectrum. When the polyimide molecule chain is oriented to a hollow fiber length direction (x-axis direction), $A_{\parallel/\perp}$ is reduced in X (FIG. 1) while being increased in Y (FIG. 2). Thus, in the surface of the hollow fiber membrane (2 to 3 μm), an orientation index indicating molecular orientation in a hollow fiber length direction.

Orientation index=($A_{\parallel/\perp}$ in Y)/($A_{\parallel/\perp}$ in X)

The following compounds were used in the examples described below.

Tetracarboxylic Acid

| | |
|---|---|
| BPDA 3,3',4,4'- biphenyl tetracarboxylic dianhydride | 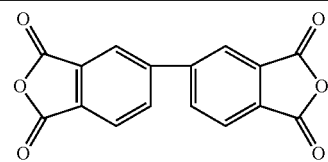 |
| 6 FDA 4,4'- (hexafluoroisopropylidene)- bis(phthalic anhydride) | 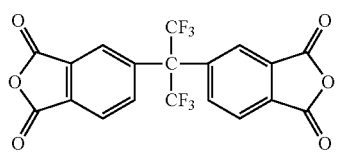 [SMILES: O=C1OC(=O)c2cc(C(c3ccc4c(c3)C(=O)OC4=O)(C(F)(F)F)C(F)(F)F)ccc21] |
| PMDA pyromellitic dianhydride | 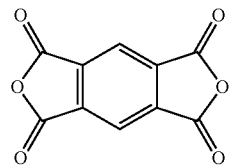 [SMILES: O=c1oc(=O)c2cc3c(=O)oc(=O)c3cc12] |

Diamine Compound

| | |
|---|---|
| TSN 3,7-diamino- dimethyldibenzothiophene=5,5- dioxide | 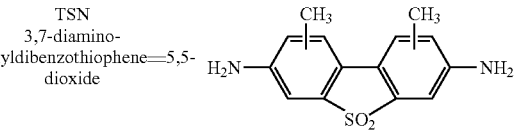 |
| TCB 4,4'-diamino-2,2',5,5'- tetrachlorobiphenyl | 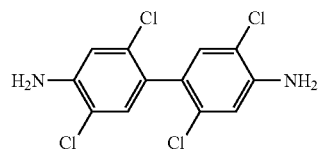 [SMILES: Nc1cc(Cl)c(-c2cc(Cl)c(N)cc2Cl)cc1Cl] |

Here, 6FDA can be referred to as 2,2-bis(3,4-dicarboxyphenyl)hexafluoropropane dianhydride. TSN is a mixture of 3,7-diamino-2,8-dimethyldibenzothiophene=5,5-dioxide as a main component and isomers having a methyl group at a different position, that is, 3,7-diamino-2,6-dimethyldibenzothiophene=5,5-dioxide, 3,7-diamino-4,6-dimethyldibenzothiophene=5,5-dioxide.

PCP: Para-Chlorophenol

Example 1

In a separable flask which could be purged with N$_2$ gas were placed monomers, BPDA/6FDA/PMDA/TSN/TCB=225/200/75/250/250 mmols together with 1882 g of PCP, and while being purged with N$_2$ gas, the mixture is polymerized with stirring by a stirrer at 190° C. for 20 hours, to prepare a 17 wt % solution of an aromatic polyimide. A viscosity at 100° C. (rotatory viscosity) was 1,940 poise. The polyimide solution obtained was filtrated through a 400 mesh wire-mesh filter to give a dopant solution.

Figure 3:
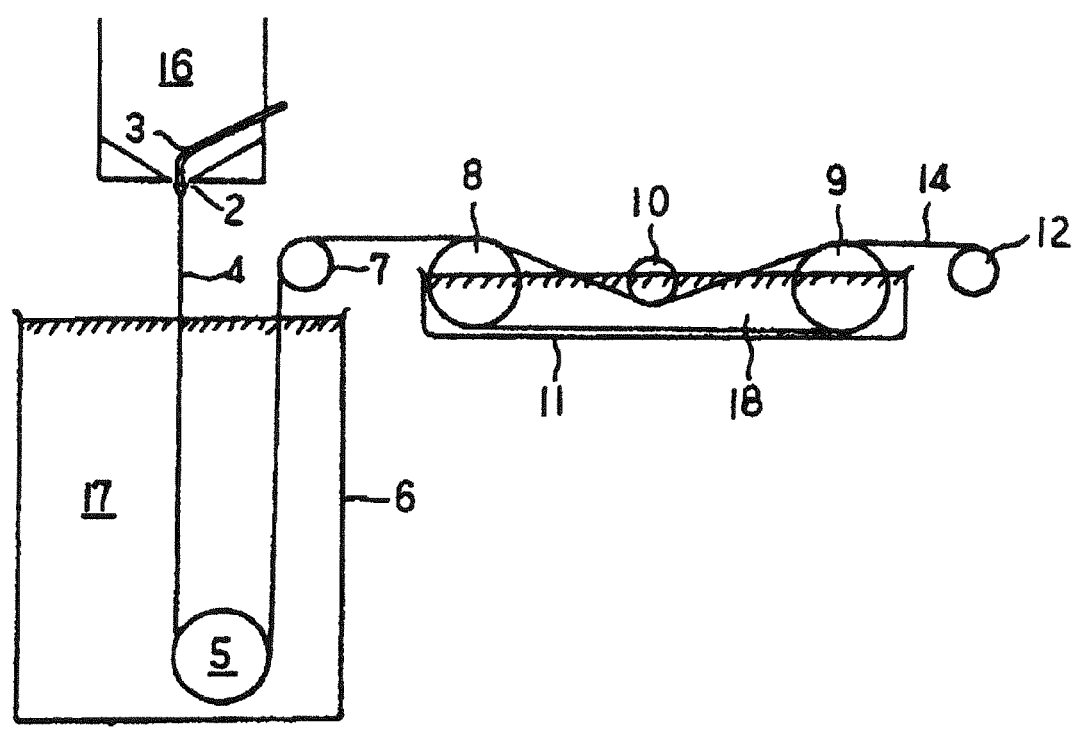
FIG. 3 schematically shows a spinning apparatus used in Examples.

The spinning apparatus used is shown in FIG. 3. A dope solution 16 is charged in a spinning apparatus equipped with a hollow fiber spinning nozzle 2 (an outer diameter of a dope extrusion unit: 1,000 μm, a slit width of the dope extrusion: 200 μm, and a diameter of a core-liquid discharge unit: 400 μm), and a dope solution and a core liquid were extruded from the nozzle 2 and a tube 3, respectively, by means of a gear pump, to form a hollow fiber material 4, which was then passed through an atmosphere of N$_2$, immersed in a first coagulation liquid tank 6 filled with a first coagulation liquid 17 (0° C., 85 wt % aqueous solution of ethanol), passed through an immersion roll 5 and then a guide roll 7, and carried back and forth in a second coagulation liquid tank 11 (0° C.) filled with a second coagulation liquid 18 while being drawn by revolving rolls 8,9 at 25 m/min, to give a hollow fiber membrane 14. The hollow fiber membrane 14 thus obtained was continuously wound on a bobbin 12 at 25 m/min. A tension applied to the hollow fiber was 0.5 N or less. The fiber was first wound as a skein, which was then washed with ethanol for completely removing PCP. After ethanol was replaced with isooctane, the fiber was dried at 100° C. and then heated at 255° C. for 30 min to give a hollow fiber membrane.

Example 2

Figure 4:
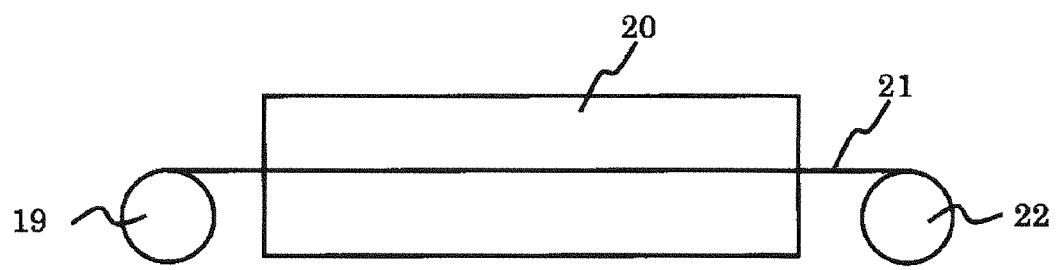
FIG. 4 schematically shows a continuous heat treatment equipment used in Examples.

The hollow fiber that was obtained by replacement with isooctane and drying as described in Example 1 was continuously heated. FIG. 4 schematically shows a continuous heating equipment used. The fiber was continuously heated using a heat treatment vessel 20 under control by a tension of 0.5 to 1.0 N at 280° C. with a rate at a front roll 19 of 50 m/min and a rate at a back roll 22 of 50.5 m/min, to give a hollow fiber membrane.

Example 3

A hollow fiber membrane was produced as described in Example 1, except that a drawing rate at a revolving roll was 23 m/min and a winding rate at a bobbin was 25 m/min.

Example 4

In Example 4, a hollow fiber membrane obtained was washed with ethanol followed by replacement of ethanol with isooctane, then dried at 100° C. and continuously heated, during which the rolls before and after the heat treatment vessel were operated at different rates for stretching, giving a hollow fiber membrane. Here, a rate at the front roll was 45 nm/min, a rate at the back roll was 50.5 m/min, and a tension applied to the hollow fiber was about 1.0 to 1.5 N. Otherwise, the process in Example 2 was conducted to give a hollow fiber membrane.

Comparative Example 1

A dope solution and a core liquid extruded from nozzles by a gear pump were passed through an atmosphere of $N_2$, then immersed in a first coagulation liquid (0° C., 85 wt % aqueous solution of ethanol) and carried back and forth in a tank through revolving rolls in a second coagulation bath (0° C.) while being drawn by the revolving rolls at 25 m/min, for extracting PCP in the dope solution, to give a hollow fiber membrane, during which the guide roll 7 shown in FIG. 1 was displaced backward (back from the paper surface in FIG. 1) by 70 mm for increasing friction to the hollow fiber while the fiber was continuously wound on a bobbin at 25 m/min. Otherwise, the process described in Example 1 was conducted to give a hollow fiber membrane.

Comparative Example 2

A hollow fiber membrane was produced as described in Example 1, except that a drawing rate at a revolving roll was 20 m/min and a winding rate at a bobbin was 25 m/min.

Comparative Examples 3 and 4

A hollow fiber membrane was produced as described in Example 2, except that a hollow fiber membrane obtained was washed with ethanol followed by replacement of ethanol with isooctane, then dried at 100° C. and continuously heated, during which the rolls before and after the heat treatment vessel were operated at different rates for stretching. In Comparative Example 3, a rate at a front roll was 40 m/min, a rate at a back roll was 50.5 m/min, and to the hollow fiber membrane, a tension of about more than 1.5 N and 2.0 N or less was applied. In Comparative Example 4, a rate at a front roll was 35 m/min, a rate at a back roll was 50.5 m/min and to the hollow fiber membrane, a tension of about more than 2.0 N and 2.5 N or less was applied.

Table 1 shows the evaluation results of the properties of the hollow fiber membranes produced in Examples and Comparative Examples.

TABLE 1

| | Permeation performance | | | Mechanical properties | | Orientation index Average |
|---|---|---|---|---|---|---|
| | $P'O_2$ | $P'N_2$ | Separation degree α $(O_2/N_2)$ | Stress $(kgf/mm^2)$ | Elongation (%) | |
| Example 1 | 9.90 | 1.74 | 5.70 | 5.72 | 24.4 | 1.17 |
| Example 2 | 9.00 | 1.57 | 5.74 | 5.63 | 27.9 | 1.14 |
| Example 3 | 8.40 | 1.42 | 5.92 | 6.32 | 20.8 | 1.21 |
| Example 4 | 6.70 | 1.15 | 5.79 | 5.56 | 18.6 | 1.23 |
| Comparative Example 1 | 5.70 | 0.97 | 5.98 | 5.68 | 14.3 | 1.46 |
| Comparative Example 2 | 5.40 | 0.93 | 5.77 | 9.29 | 13.0 | 1.32 |
| Comparative Example 3 | 7.60 | 1.45 | 5.28 | 5.71 | 13.8 | 1.23 |
| Comparative Example 4 | 9.40 | 1.94 | 4.85 | 6.47 | 11.5 | 1.37 |

Note)
Unit of $P'O_2$ and $P'N_2$: $10^{-5} \times cm^3(STP)/(cm^2 \cdot s \cdot cmHg)$

INDUSTRIAL USABILITY

An asymmetric hollow fiber membrane for gas separation of the present invention is excellent in gas separation performance for oxygen and nitrogen gases and in mechanical properties, and it can be, therefore, suitably used for providing a nitrogen-rich air with an increased nitrogen concentration or an oxygen-rich air with an increased concentration of oxygen from the air and for separating other gases.

EXPLANATIONS OF LETTERS OR NUMERALS

2: nozzle
3: tube
4: hollow fiber-shaped material
5: immersion roll
6: first coagulation liquid tank
7: guide roll
8: revolving roll 1
9: revolving roll 2
10: press roll
11: second coagulation liquid tank
12: bobbin
14: hollow fiber
16: dope solution
17: first coagulation liquid
18: second coagulation liquid
19: front roll
20: heat treatment vessel
21: hollow fiber
22: back roll

The invention claimed is:
1. An asymmetric hollow fiber membrane for gas separation made of a soluble aromatic polyimide, wherein
an orientation index is 1.3 or less,
a separation coefficient $\alpha(P'O_2/P'N_2)$ which represents a ratio of permeation rate of oxygen gas and nitrogen gas at 40° C. is 5.3 or more, and
a tensile elongation at break is 15% or more.

2. The asymmetric hollow fiber membrane for gas separation according to claim 1, wherein an oxygen gas permeation rate P'O$_2$ at 40° C. is $6.0\times10^{-5}$ cm$^3$ (STP)/cm$^2$·sec·cmHg or more.

3. The asymmetric hollow fiber membrane for gas separation according to claim 1, wherein the soluble aromatic polyimide comprises a repeating unit represented by general formula (1):

Formula (1)

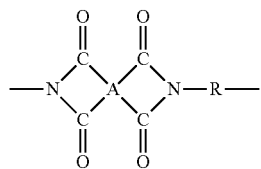

wherein in the general formula (1), 25 to 100 mol % of A is a tetravalent unit based on a biphenyl structure represented by formula (2):

Formula (2)

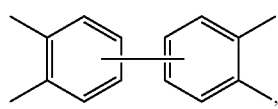

to 70 mol % of A is a tetravalent unit based on a diphenyl-hexafluoropropane structure represented by formula (3):

Formula (3)

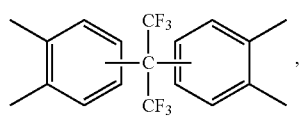

and 0 to 30 mol % of A is a tetravalent unit based on a phenyl structure represented by formula (4):

Formula (4)

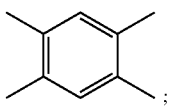

and in general formula (1), 30 to 70 mol % of R is a divalent unit based on a diphenylene sulfone structure represented by formula (5):

Formula (5)

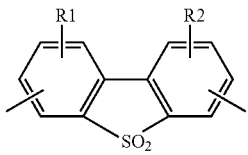

wherein R1 and R2 in formula (5) are a hydrogen atom or a lower alkyl group, and 30 to 70 mol % of R is a divalent unit based on a biphenyl structure represented by formula (6):

Formula (6)

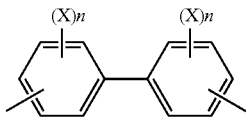

wherein X in formula (6) is a chlorine or bromine atom and n is 1 to 3.

4. A process comprising selectively separating and collecting a particular gas from a mixed gas containing a plurality of gases with the asymmetric hollow fiber membrane for gas separation according to claim 1.

5. A process comprising producing an oxygen-rich air or nitrogen-rich air from the air with the asymmetric hollow fiber membrane for gas separation according to claim 1.

* * * * *

UNITED STATES PATENT AND TRADEMARK OFFICE
CERTIFICATE OF CORRECTION

PATENT NO. : 8,734,568 B2  
APPLICATION NO. : 13/638087  
DATED : May 27, 2014  
INVENTOR(S) : Hiroki Hisamori Page 1 of 1

It is certified that error appears in the above-identified patent and that said Letters Patent is hereby corrected as shown below:

In the Specification

Column 5, Line 10, Change "2,2',3,3,5,5'-hexachlorobenzidine," to --2,2',3,3',5,5'-hexachlorobenzidine,--.

Column 8, Line 41, Change "of" to --of,--.

Column 11, Line 30 (Approx.), Change "nm/min," to --m/min,--.

In the Claims

Column 13, Line 31, Claim 3, change "to" to --0 to--.

Signed and Sealed this  
Tenth Day of February, 2015

Michelle K. Lee  
*Deputy Director of the United States Patent and Trademark Office*